US009135825B2

(12) United States Patent
Nagata

(10) Patent No.: US 9,135,825 B2
(45) Date of Patent: Sep. 15, 2015

(54) RISK DEGREE CALCULATION DEVICE

(75) Inventor: Shinichi Nagata, Yokohama (JP)

(73) Assignee: TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 222 days.

(21) Appl. No.: 13/580,304

(22) PCT Filed: Feb. 22, 2010

(86) PCT No.: PCT/JP2010/052634
§ 371 (c)(1),
(2), (4) Date: Aug. 21, 2012

(87) PCT Pub. No.: WO2011/101988
PCT Pub. Date: Aug. 25, 2011

(65) Prior Publication Data
US 2012/0323479 A1   Dec. 20, 2012

(51) Int. Cl.
*G08G 1/16* (2006.01)
*B60W 50/00* (2006.01)
*G01S 13/93* (2006.01)
*G01S 17/02* (2006.01)
*G06K 9/00* (2006.01)
*B60Q 9/00* (2006.01)
*B60W 50/14* (2012.01)

(52) U.S. Cl.
CPC .............. *G08G 1/167* (2013.01); *B60Q 9/008* (2013.01); *G08G 1/166* (2013.01); *B60W 2050/143* (2013.01); *B60W 2520/06* (2013.01); *B60W 2520/14* (2013.01); *G01S 13/931* (2013.01); *G01S 17/023* (2013.01); *G06K 9/00845* (2013.01); *G06T 2207/30248* (2013.01)

(58) Field of Classification Search
CPC .............. G08G 1/16; B60W 2250/10; B60W 2050/143; B60W 2520/06; B60W 2520/14; G01S 13/931; G01S 17/023; G05B 2214/40442; G06K 9/00845; G06T 2207/30248
USPC .......................................... 701/300, 301, 302
See application file for complete search history.

(56) References Cited

U.S. PATENT DOCUMENTS 5,347,459 A * 9/1994 Greenspan et al. ........... 700/255
6,859,144 B2 * 2/2005 Newman et al. ............... 340/576
(Continued)

FOREIGN PATENT DOCUMENTS

JP   2005-043375 A   2/2005
JP   2006-154967 A   6/2006
(Continued)

OTHER PUBLICATIONS

International Search Report mailed Mar. 16, 2010 of PCT/JP2010/052634.

*Primary Examiner* — Fadey Jabr
*Assistant Examiner* — Thomas Ingram
(74) *Attorney, Agent, or Firm* — Kenyon & Kenyon LLP

(57) ABSTRACT

A risk degree estimation device of a driving assistance device calculates the potential risk degree at a plurality of intersection points in a mesh set around a host vehicle. The risk degree estimation device changes the amount of information relating to the potential risk degree calculated for the entire region of the mesh in which the intersection points are set in accordance with at least one of the environment and state of the host vehicle. For this reason, it becomes possible to calculate the potential risk degree around the host vehicle depending on the situation.

13 Claims, 6 Drawing Sheets

(56) References Cited

U.S. PATENT DOCUMENTS

| | | | |
|---|---|---|---|
| 7,499,638 B2* | 3/2009 | Arai et al. | 396/108 |
| 8,744,744 B2* | 6/2014 | Takagi | 701/301 |
| 2002/0107637 A1* | 8/2002 | Okamura et al. | 701/301 |
| 2002/0177953 A1* | 11/2002 | Okamura et al. | 701/301 |
| 2006/0072914 A1* | 4/2006 | Arai et al. | 396/106 |
| 2009/0088966 A1* | 4/2009 | Yokoyama et al. | 701/201 |
| 2009/0115655 A1* | 5/2009 | Scherzinger | 342/357.02 |
| 2009/0167516 A1* | 7/2009 | Kogawara et al. | 340/439 |
| 2010/0225738 A1* | 9/2010 | Webster | 348/36 |
| 2010/0305857 A1* | 12/2010 | Byrne et al. | 701/301 |
| 2010/0321174 A1* | 12/2010 | Chen et al. | 340/435 |

FOREIGN PATENT DOCUMENTS

| | | |
|---|---|---|
| JP | 2006-350699 A | 12/2006 |
| JP | 2010-003254 A | 1/2010 |

\* cited by examiner

RISK DEGREE CALCULATION DEVICE

This is a 371 national phase application of PCT/JP2010/052634 filed 22 Feb. 2010, the contents of which are incorporated herein by reference.

TECHNICAL FIELD

The present invention relates to a risk degree calculation device, and in particular, to a risk degree calculation device which calculates a risk degree around a host vehicle.

BACKGROUND ART

A device which calculates the potential risk degree around a vehicle so as to increase traveling safety has been suggested. For example, Patent Literature 1 discloses a minimum risk locus generation device which detects a road shape and obstacles and calculates a minimum risk traveling locus, and an endangerment warning device using the same.

The endangerment warning device of Patent Literature 1 includes an obstacle detection radar, a white line detection camera, a traveling state detection sensor, and a CPU. The CPU acquires information relating to an obstacle from the obstacle detection radar, and acquires the road shape and the traveling position of the host vehicle from the white line detection camera. The CPU also acquires vehicle speed data and the operation situation of a direction indicator from the traveling state detection sensor, and acquires road information from a navigation device.

The CPU estimates a traveling route in a traveling route estimation unit on the basis of the acquired information, and sets the value of the risk degree at each point on the road in a risk degree setting unit. In this case, the surroundings of the vehicle are divided into a virtual mesh (lattice-shaped regions), and the value of the risk degree in each lattice is calculated. The CPU calculates the minimum risk traveling locus, in which the total risk degree is minimal, in a minimum risk locus calculation unit. When the risk degree on the minimum risk traveling locus exceeds a warning threshold value, a determination unit of the CPU outputs a warning to a display device and a speech device.

CITATION LIST

Patent Literature

[Patent Literature 1] Japanese Unexamined Patent Application Publication No. 2006-154967

SUMMARY OF INVENTION

Technical Problem

However, according to the above-described technique, the spacing between the lattices of the mesh set for calculating the risk degree is constant. For this reason, in a situation in which the risk degree locally grows, the potential risk degree may not be appropriately figured out.

For example, when the road shape changes, for example, when the vehicle travels along a curve, the risk degree differs depending on the direction of the curve. For this reason, when calculating the risk degree from a mesh with equal lattice spacing, the potential risk degree in the traveling route of the host vehicle may not be appropriately calculated.

In order to increase the accuracy of risk degree calculation, it is necessary to make the lattice spacing of the mesh smaller as a whole, and this may cause an increase in the calculation load on the device. Depending on the lattice-shaped region of the mesh, a case where there is a lattice-shaped region unrelated to the calculation of the target route of the host vehicle or the like or, conversely, there is no lattice-shaped region at a necessary position is considered. In this case, the potential risk degree may not be appropriately calculated in accordance with the position of an obstacle around the host vehicle, the road shape, or the like.

The invention has been accomplished in consideration of this situation, and an object of the invention is to provide a risk degree calculation device capable of calculating the risk degree around the host vehicle depending on the situation.

Solution to Problem

The invention provides a risk degree calculation device including a risk degree calculation unit which calculates the risk degree at a plurality of points set around a host vehicle. The risk degree calculation unit changes the amount of information relating to the risk degree calculated for the entire region in which the points are set in accordance with at least one of the environment and state of the host vehicle.

With this configuration, the risk degree calculation unit calculates the risk degree at a plurality of points set around the host vehicle. The risk degree calculation unit changes the amount of information relating to the risk degree calculated for the entire region in which the points are set in accordance with at least one of the environment and state of the host vehicle. For this reason, it becomes possible to calculate the risk degree around the host vehicle depending on the situation.

In this case, the risk degree calculation unit may change the region in which the points are set in accordance with at least one of the environment and state of the host vehicle to change the amount of information relating to the risk degree calculated for the entire region in which the points are set.

With this configuration, the risk degree calculation unit changes the region in which the points are set in accordance with at least one of the environment and state of the host vehicle to change the amount of information relating to the risk degree calculated for the entire region in which the points are set, making it possible to calculate the risk degree around the host vehicle in the region depending on the situation.

The risk degree calculation unit may change the spacing between the points in accordance with at least one of the environment and state of the host vehicle to change the amount of information relating to the risk degree calculated for the entire region in which the points are set.

With this configuration, the risk degree calculation unit changes the spacing between the points in accordance with at least one of the environment and state of the host vehicle to change the amount of information relating to the risk degree calculated for the entire region in which the points are set, making it possible to calculate the risk degree around the host vehicle at the density of the points, in which the risk degree is calculated, depending on the situation.

The risk degree calculation unit may change the amount of information relating to the risk degree calculated at each point in accordance with at least one of the environment and state of the host vehicle to change the amount of information relating to the risk degree calculated for the entire region in which the points are set.

With this configuration, the risk degree calculation unit changes the amount of information relating to the risk degree calculated at each point in accordance with at least one of the environment and state of the host vehicle, making it possible to calculate the risk degree around the host vehicle with the calculation load depending on the situation.

The risk degree calculation unit may make the amount of information relating to the risk degree calculated in the traveling direction of the host vehicle greater than the amount of information relating to the risk degree calculated in a direction other than the traveling direction of the host vehicle.

With this configuration, the risk degree calculation unit makes the amount of information relating to the risk degree calculated in the traveling direction of the host vehicle greater than the amount of information relating to the risk degree calculated in a direction other than the traveling direction of the host vehicle. For this reason, it is possible to intensively calculate the risk degree in the traveling direction of the host vehicle which is more important, making it possible to calculate the risk degree around the host vehicle with the distribution of the amount of information and the calculation load depending on the situation.

In this case, the risk degree calculation unit may make the amount of information relating to the risk degree calculated in the steering direction of the host vehicle greater than the amount of information relating to the risk degree in a direction other than the steering direction of the host vehicle.

With this configuration, the risk degree calculation unit makes the amount of information relating to the risk degree calculated in the steering direction of the host vehicle greater than the amount of information relating to the risk degree in a direction other than the steering direction of the host vehicle. For this reason, it is possible to intensively calculate the risk degree in the traveling direction of the host vehicle on the basis of the steering direction directly representing the traveling direction of the host vehicle, making it possible to calculate the risk degree around the host vehicle with the distribution of the amount of information and the calculation load depending on the situation.

The risk degree calculation unit may make the amount of information relating to the risk degree calculated per unit area of the region in which the points are set when the speed of the host vehicle is high smaller than the amount of information relating to the risk degree calculated per unit area of the region in which the points are set when the speed of the host vehicle is low.

With this configuration, the risk degree calculation unit makes the amount of information relating to the risk degree calculated per unit area of the region in which the points are set when the speed of the host vehicle is high smaller than the amount of information relating to the risk degree calculated per unit area of the region in which the points are set when the speed of the host vehicle is low. For this reason, it is possible to eliminate an unnecessary operation to calculate the detailed risk degree in a narrow region with less importance during high speed, making it possible to calculate the risk degree around the host vehicle with the distribution of the amount of information and the calculation load depending on the situation.

When an accelerator pedal of the host vehicle is stepped on, the risk degree calculation unit may make the amount of information relating to the risk degree calculated in the traveling direction of the host vehicle greater than the amount of information relating to the risk degree calculated in a direction other than the traveling direction of the host vehicle.

With this configuration, when the accelerator pedal of the host vehicle is stepped on, the risk degree calculation unit makes the amount of information relating to the risk degree calculated in the traveling direction of the host vehicle greater than the amount of information relating to the risk degree calculated in a direction other than the traveling direction of the host vehicle. For this reason, it is possible to intensively calculate the risk degree in the traveling direction of the host vehicle which is more important during acceleration before the host vehicle is actually accelerated, making it possible to calculate the risk degree around the host vehicle with the distribution of the amount of information and the calculation load depending on the situation.

When a brake pedal of the host vehicle is stepped on, the risk degree calculation unit may make the amount of information relating to the risk degree calculated in an opposite direction to the traveling direction of the host vehicle greater than the amount of information relating to the risk degree calculated in the traveling direction of the host vehicle.

With this configuration, when the brake pedal of the host vehicle is stepped on, the risk degree calculation unit makes the amount of information relating to the risk degree calculated in an opposite direction to the traveling direction of the host vehicle greater than the amount of information relating to the risk degree calculated in the traveling direction of the host vehicle. For this reason, it is possible to intensively calculate the risk degree in the opposite direction to the traveling direction of the host vehicle which is more important during deceleration before the host vehicle is actually decelerated, making it possible to calculate the risk degree around the host vehicle with the distribution of the amount of information and the calculation load depending on the situation.

When a direction indicator of the host vehicle is operated, the risk degree calculation unit may make the amount of information relating to the risk degree calculated in the indication direction of the direction indicator of the host vehicle greater than the amount of information relating to the risk degree calculated in an opposite direction to the indication direction of the direction indicator of the host vehicle.

With this configuration, when the direction indicator of the host vehicle is operated, the risk degree calculation unit makes the amount of information relating to the risk degree calculated in the indication direction of the direction indicator of the host vehicle greater than the amount of information relating to the risk degree calculated in an opposite direction to the indication direction of the direction indicator of the host vehicle. For this reason, it is possible to intensively calculate the risk degree in the traveling direction of the host vehicle which is more important during steering before the traveling direction of the vehicle is actually changed, making it possible to calculate the risk degree around the host vehicle with the distribution of the amount of information and the calculation load depending on the situation.

The risk degree calculation unit may make the amount of information relating to the risk degree calculated in a blind spot when viewed from the host vehicle greater than the amount of information relating to the risk degree calculated in a region other than the blind spot when viewed from the host vehicle.

With this configuration, the risk degree calculation unit makes the amount of information relating to the risk degree calculated in the blind spot when viewed from the host vehicle greater than the amount of information relating to the risk degree calculated in the region other than the blind spot when viewed from the host vehicle. For this reason, it is possible to intensively calculate the risk degree in the blind spot when viewed from the host vehicle which is more importance, making it possible to calculate the risk degree around the host vehicle with the distribution of the amount of information and the calculation load depending on the situation.

The risk degree calculation unit may make the amount of information relating to the risk degree calculated in either the face direction or the eye direction of the driver of the host vehicle greater than the amount of information relating to the risk degree calculated in a direction other than either the face direction or the eye direction of the driver of the host vehicle. For this reason, it is possible to intensively calculate the risk degree in either the face direction or the eye direction of the driver of the host vehicle which should be preferentially calculated in the normal state, making it possible to calculate the risk degree around the host vehicle with the distribution of the amount of information and the calculation load depending on the situation.

The risk degree calculation unit may make the amount of information relating to the risk degree calculated in a direction other than either the face direction or the eye direction of the driver of the host vehicle greater than the amount of information relating to the risk degree calculated in either the face direction or the eye direction of the driver of the host vehicle.

With this configuration, the risk degree calculation unit makes the amount of information relating to the risk degree calculated in a direction other than either the face direction or the eye direction of the driver of the host vehicle greater than the amount of information relating to the risk degree calculated in either the face direction or the eye direction of the driver of the host vehicle. For this reason, it is possible to intensively calculate the risk degree in the opposite direction to either the face direction or the eye direction of the driver of the host vehicle which should be preferentially calculated in a situation in which the risk degree is high, making it possible to calculate the risk degree around the host vehicle with the distribution of the amount of information and the calculation load depending on the situation.

The risk degree calculation unit may make the amount of information relating to the risk degree calculated when the driver of the host vehicle has low vigilance greater than the amount of information relating to the risk degree calculated when the driver of the host vehicle has high vigilance.

With this configuration, the risk degree calculation unit makes the amount of information relating to the risk degree calculated when the driver of the host vehicle has low vigilance greater than the amount of information relating to the risk degree calculated when the driver of the host vehicle has high vigilance. For this reason, it is possible to intensively calculate the risk degree in a situation in which the driver has low vigilance and the risk degree is high, making it possible to calculate the risk degree around the host vehicle with the distribution of the amount of information and the calculation load depending on the situation.

The risk degree calculation device may further include a target route generation unit which generates a target route of the host vehicle on the basis of the risk degree at a plurality of points calculated by the risk degree calculation unit.

With this configuration, the target route generation unit generates the target route of the host vehicle on the basis of the risk degree at a plurality of points calculated by the risk degree calculation unit. For this reason, the host vehicle travels along the target route generated on the basis of the risk degree, thereby reducing risk.

Advantageous Effects of Invention

According to the risk degree calculation device of the invention, it becomes possible to calculate the risk degree around the host vehicle depending on the situation.

DESCRIPTION OF EMBODIMENTS

Figure 1:
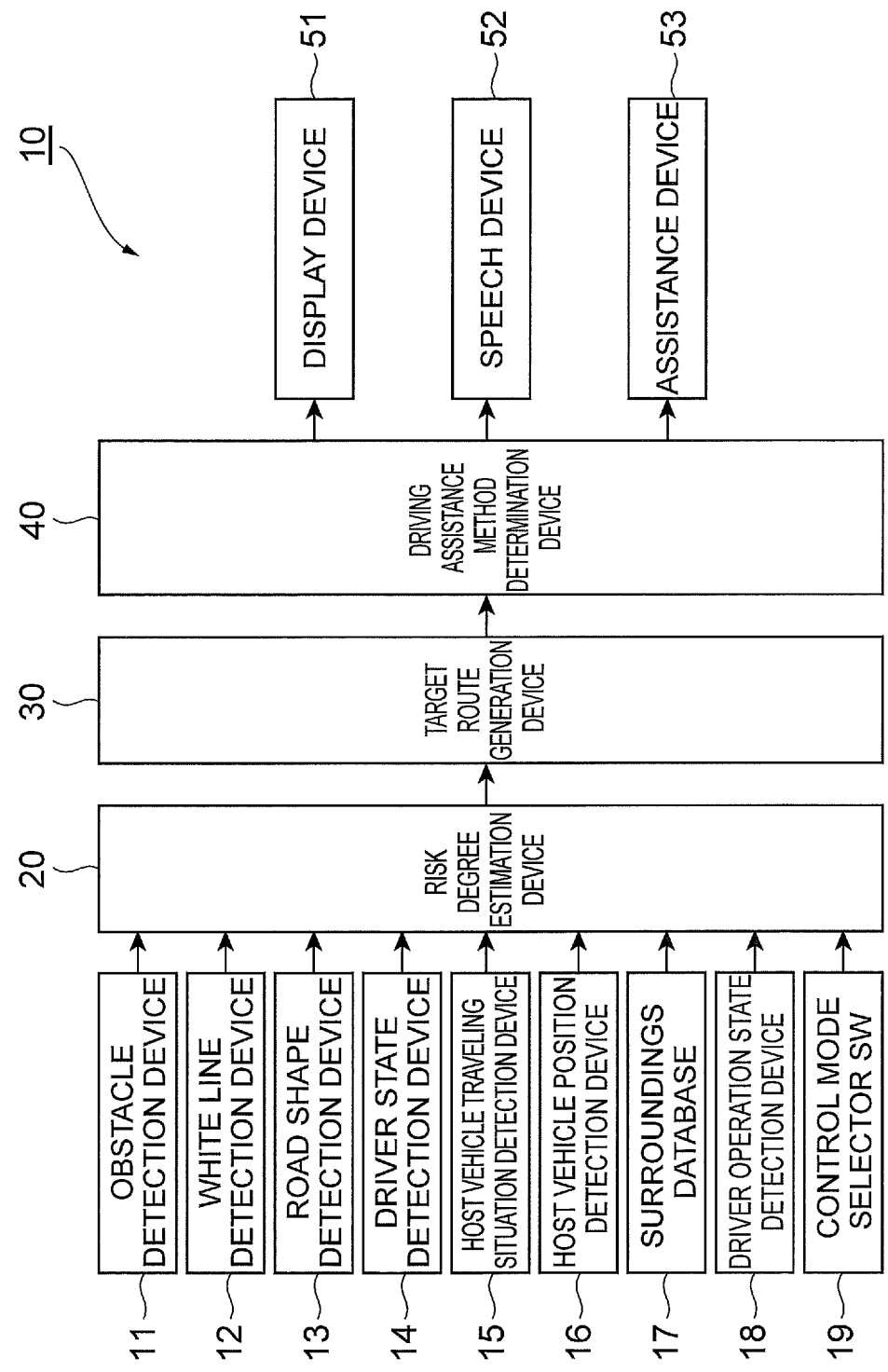
FIG. 1 is a block diagram showing the configuration of a driving assistance device according to an embodiment.
Figure 2:
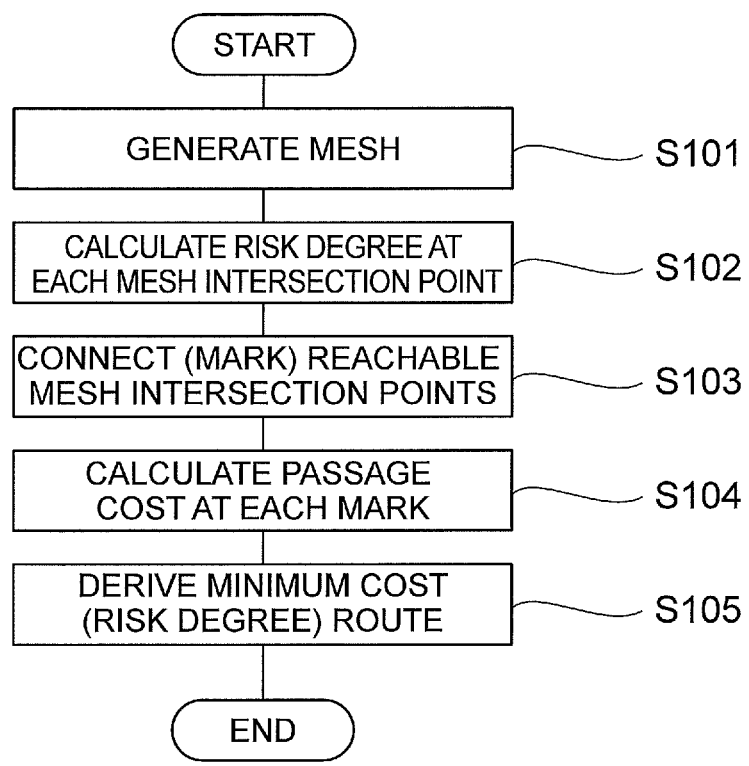
FIG. 2 is a flowchart schematically showing the operation of the driving assistance device according to the embodiment.

Hereinafter, an embodiment of the invention will be described with reference to the drawings. In this embodiment, a potential risk degree calculation device of the invention is applied to a driving assistance device. As shown in FIG. 1, a driving assistance device 10 includes an obstacle detection device 11, a white line detection device 12, a road shape detection device 13, a driver state detection device 14, a host vehicle traveling situation detection device 15, a host vehicle position detection device 16, a surroundings database 17, a driver operation state detection device 18, a control mode selector SW 19, a risk degree estimation device 20, a target route generation device 30, a driving assistance method determination device 40, a display device 51, a speech device 52, and an assistance device 53.

The obstacle detection device 11 is specifically a millimeter-wave radar, a laser radar, a stereo camera, or the like, and detects obstacles around the host vehicle. The white line detection device 12 is a sensor, such as a camera, which recognizes white lines on a road defining the lane of the road. The white line detection device 12 is used to recognize the lane in which the host vehicle travels. The road shape detection device 13 is specifically a laser radar or the like, and detects the shape of the road on which the host vehicle travels.

The driver state detection device 14 detects the face direction or the eye direction of the driver of the host vehicle, or detects the vigilance of the driver of the host vehicle to detect dozing of the driver of the host vehicle. Specifically, the driver state detection device 14 captures the face of the driver and performs pattern recognition on the captured video to detect the face direction or the eye direction of the driver. The driver state detection device 14 not only captures the face of the driver and performs pattern recognition on the captured video, but also detects the pulse, brain waves, or the like of the driver to detect the vigilance of the driver.

The host vehicle traveling situation detection device 15 detects the vehicle speed or yaw rate of the host vehicle, or the indication direction of a direction indicator. The host vehicle traveling situation detection device 15 detects the rotational speed of the axle of the host vehicle to detect the vehicle speed of the host vehicle. The host vehicle traveling situation detection device 15 detects the Coriolis force acting on the host vehicle using a piezoelectric element or the like to detect the yaw rate of the host vehicle.

The host vehicle position detection device 16 specifically performs the positioning of the host vehicle using a GPS (Global Positioning System). The surroundings database 17 acquires information, such as information relating to intersections around the host vehicle, information relating to facilities, and information relating to high-accident locations, stored in a database inside or outside the host vehicle along with the positioning information of the host vehicle using the GPS.

The driver operation state detection device 18 detects steering torque, a brake pedal stroke (stepped amount), and an accelerator pedal stroke (stepped amount) by the driving operation of the driver to detect the steering amount, the braking amount, and the acceleration amount.

The control mode selector SW 19 is provided to set a driving assistance system which assists the driving operation of the driver of the host vehicle. Specifically, the control mode selector SW 19 is provided to set LKA (Lane Keeping Assist) for allowing the host vehicle to travel without departing from the lane, LKD (Lane Departure Warning) for giving a warning when the host vehicle departs from the lane, ACC (Adaptive Cruse Control) for allowing the host vehicle to travel at a predetermined speed while following a preceding vehicle, PCS (Pre-Crush Safety) for avoiding collision of the host vehicle or reducing damage due to collision, and the actuation of a parking assistance system which assists driving during parking. Information relating to the setting state of the driving assistance system is sent to the risk degree estimation device 20.

The risk degree estimation device 20 changes the setting of the mesh having the lattice-shaped regions in the vicinity of the host vehicle on the basis of information from the obstacle detection device 11 to the control mode selector SW 19, and calculates the potential risk degree (Rish Potential) at each intersection point of the mesh.

The target route generation device 30 sets the target route of the host vehicle in accordance with the potential risk degree at each intersection point of the mesh estimated by the risk degree estimation device 20.

The driving assistance method determination device (driving assistance ECU) 40 determines a driving assistance method for the driver of the host vehicle on the basis of the potential risk degree estimated by the risk degree estimation device 20 and the target route set by the target route generation device 30.

The display device 51 visually displays information necessary for a HUD (Head-Up Display) or a meter on the basis of the driving assistance method determined by the driving assistance method determination device 40.

The speech device 52 guides necessary information by sound or gives a warning using a speaker or a buzzer on the basis of the driving assistance method determined by the driving assistance method determination device 40.

The assistance device 53 actuates a brake actuator, an accelerator actuator, and an EPS (Electronic Power Steering) actuator on the basis of the driving assistance method determined by the driving assistance method determination device 40 to adjust the braking amount, the acceleration amount, and the steering amount.

Hereinafter, the operation of the driving assistance device 10 of this embodiment will be described. In the following example, depending on the yaw rate of the host vehicle, the larger the yaw rate, the wider a mesh generation region in the yawing direction is set. First, the overall operation will be described. The risk degree estimation device 20 of the driving assistance device 10 generates a mesh on the basis of the yaw rate of the host vehicle detected by the host vehicle traveling situation detection device 15 (S101).

The risk degree estimation device 20 calculates the risk degree at each intersection point of the mesh (S102). The risk degree may be calculated by multiplying each piece of information detected by the obstacle detection device 11 to the control mode selector SW 19 at each intersection point of the mesh by a predetermined weight coefficient and adding the information.

The target route generation device 30 connects the intersection points of the mesh to be reachable by the host vehicle to mark routes (S103). The target route generation device 30 calculates a passage cost, which is the sum of the risk degree at the intersection points in each marked route, on the basis of the risk degree at each intersection point of the mesh calculated by the risk degree estimation device 20 (S104). The target route generation device 30 derives a route with the smallest passage cost as the target route (S105). The driving assistance method determination device 40 performs driving assistance necessary for the driver of the host vehicle using the display device 51, the speech device 52, or the assistance device 53 on the basis of the target route derived by the target route generation device 30 and the risk degree at each intersection point of the mesh in the target route calculated by the risk degree estimation device 20.

Figure 3:
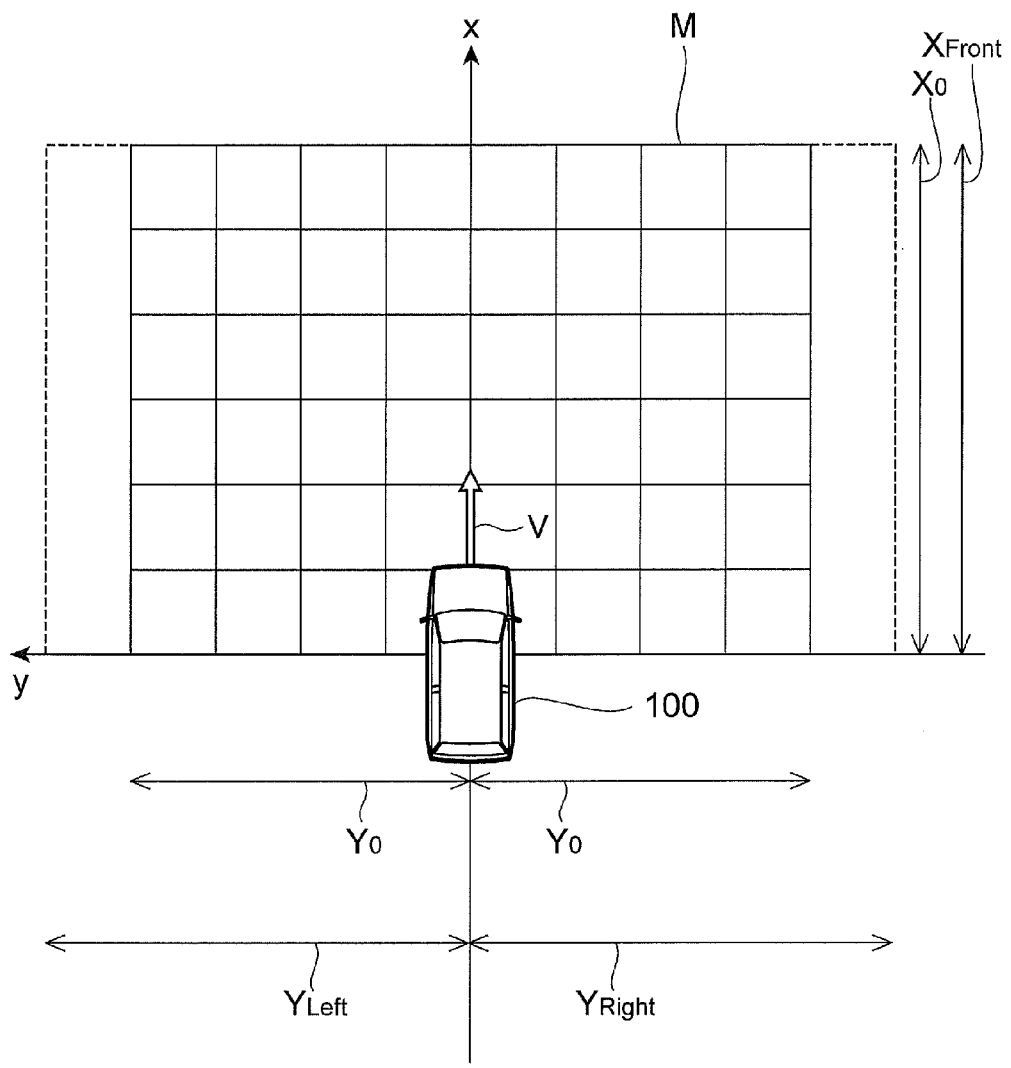
FIG. 3 is a diagram showing a mesh according to the embodiment.

Hereinafter, the details of an operation to generate a mesh will be described. As shown in FIG. 3, it is assumed that a mesh M having lattice-shaped regions is generated in the vicinity of the host vehicle 100. In FIG. 3, $X_0$ [m] is an initial value of the length of a mesh generation region in the X-axis direction (the front-back direction of the host vehicle 100), and $Y_0$ [m] is an initial value of the length of a mesh generation region in the Y-axis direction (the left-right direction of the host vehicle 100). In FIG. 3, $X_{FRONT}$ [m] is the length of a mesh generation region which is finally generated in the X-axis forward direction (the front of the host vehicle 100). $Y_{LEFT}$ [m] and $Y_{RIGHT}$ [m] are respectively the length of a mesh generation region which is finally generated in the Y-axis left direction and the Y-axis right direction, and the Y-axis left direction is positive.

Here, T [s] is a mesh generation time. v [m/s] is the vehicle speed of the host vehicle 100. γ [rad/s] is the yaw rate of the host vehicle 100, and counterclockwise rotation is positive. The relationship $X_0 = v \times T$ is established. If a host vehicle lateral acceleration is $a_y$, $a_y = v \times \gamma$. Accordingly, the lateral displacement position y of the host vehicle 100 after T seconds is expressed by Expression (1).

$$y = (1/2)a_y T^2 \qquad (1)$$
$$= (1/2)v\gamma T^2$$

Figure 4:
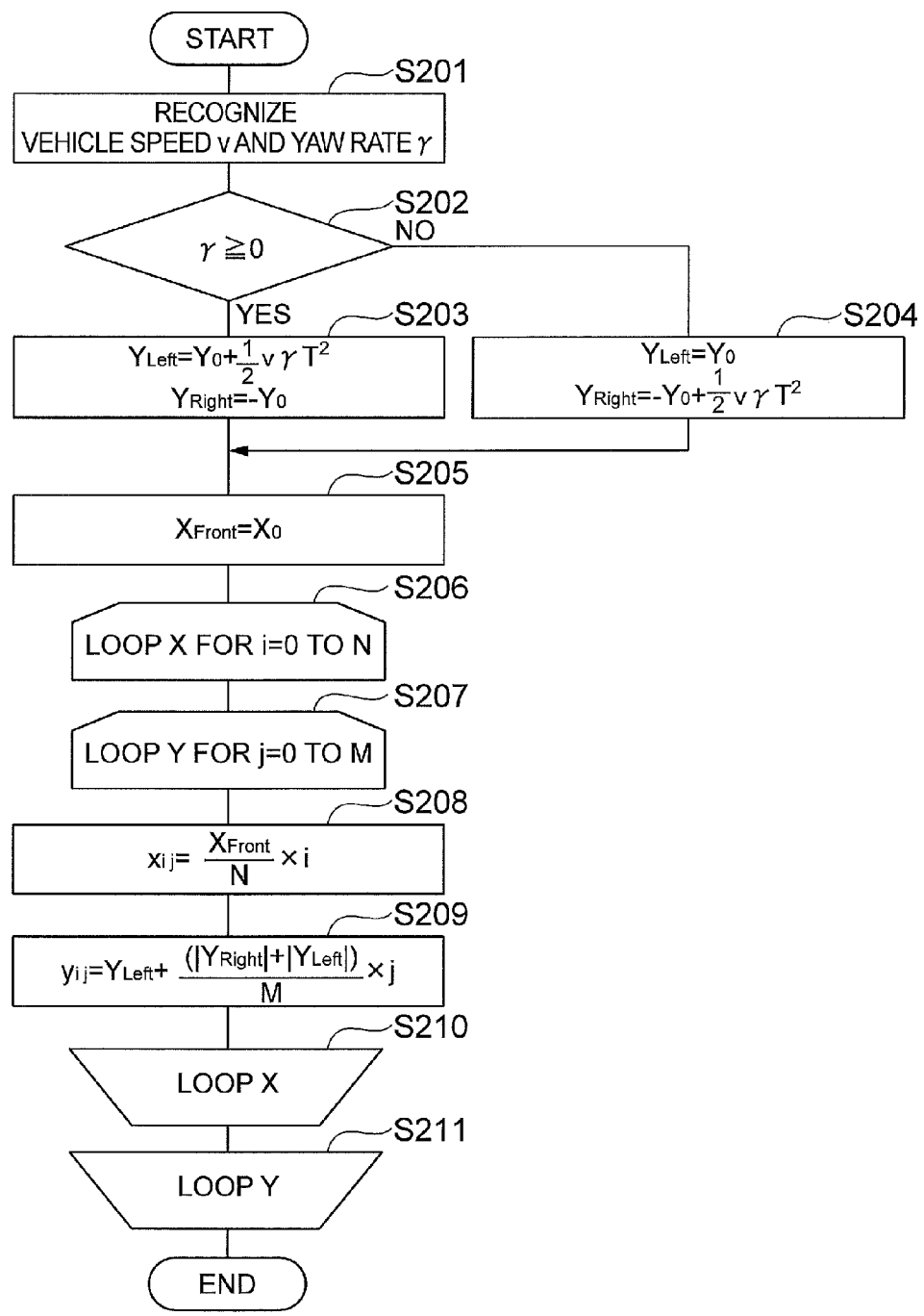
FIG. 4 is a flowchart showing an operation to generate a mesh.

As shown in FIG. 4, when generating the mesh, the risk degree estimation device 20 of the driving assistance device 10 recognizes the vehicle speed v and the yaw rate γ of the host vehicle 100 using the host vehicle traveling situation detection device 15 (S201). When the yaw rate γ≥0 (S202), since $Y_{LEFT} = Y_0 + y$ and $Y_{RIGHT} = -Y_0$, the risk degree estimation device 20 substitutes Expression (1) to calculate $Y_{LEFT}$ and $Y_{RIGHT}$ of Expression (2) (S203). When the yaw rate γ=0, since the lateral displacement position y=0, $Y_{LEFT} = Y_0$ and $Y_{RIGHT} = -Y_0$.

$$Y_{LEFT} = Y_0 (1/2)v\gamma T^2$$
$$Y_{RIGHT} = -Y_0 \qquad (2)$$

When the yaw rate γ≥0 is not established (S202), since $Y_{LEFT} = Y_0$ and $Y_{RIGHT} = -Y_0 + y$, the risk degree estimation device 20 substitutes Expression (1) to calculate $Y_{LEFT}$ and $Y_{RIGHT}$ of Expression (3) (S204). With the above, the region of the mesh M which is wide in the yawing direction of the host vehicle 100 and is narrow on the other side of the yawing direction is set.

$$Y_{LEFT} = Y_0$$
$$Y_{RIGHT} = -Y_0 + (1/2)v\gamma T^2 \qquad (3)$$

In this example, the risk degree estimation device 20 sets the initial value of $X_{FRONT}$ as it is, that is, $X_{FRONT}=X_0$ (S205). With the above, a region for generating the mesh M in the vicinity of the host vehicle 100 is calculated.

Figure 5:
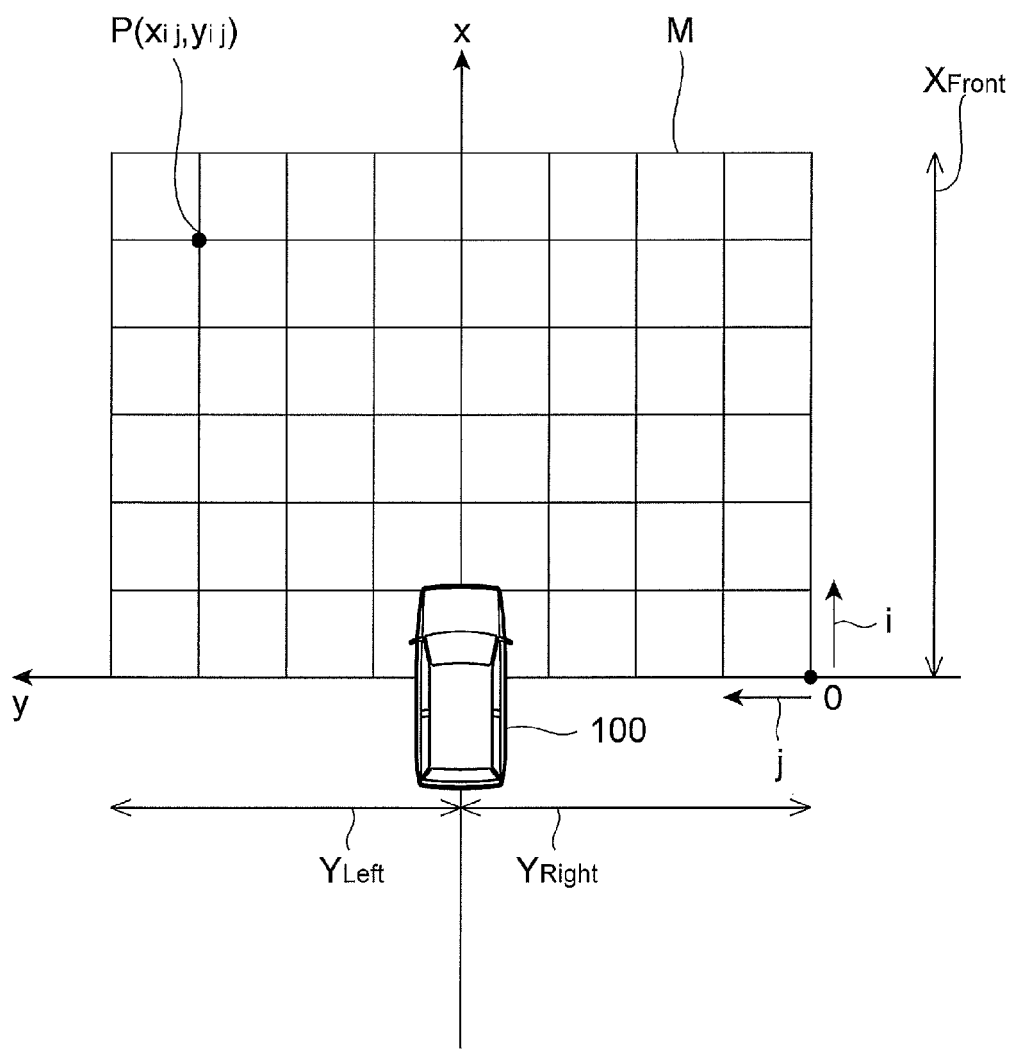
FIG. 5 is a diagram showing a mesh in which each mesh apex P is generated.

Next, the risk degree estimation device 20 calculates the coordinates of each intersection point of the mesh M divided in a lattice shape. It is assumed that the number of divisions in the X direction of the mesh M is N, and the number of divisions in the Y direction is M. As shown in FIG. 5, it is assumed that a unit vector in the X direction of the smallest divided lattice-shaped region is i, and a unit vector in the Y direction is j. Here, it is assumed that the coordinates of an intersection point P of the mesh M of the i-th in the X direction and the j-th in the Y direction from the origin O are $P(x_{ij}, y_{ij})$ with respect to the origin O in FIG. 5.

The risk degree estimation device 20 calculates Expression (4) for i=0 to N in the X direction, and calculates the X coordinate of each intersection point P (S206, S208, and S210).

$$x_{ij}=(X_{FRONT}/N) \times i \qquad (4)$$

The risk degree estimation device 20 calculates Expression (5) for j=0 to M in the Y direction, and calculates the Y coordinate of each intersection point P (S207, S209, and S211). With the above process, the risk degree estimation device 20 calculates the region of the mesh M formed in the vicinity of the host vehicle 100 and the coordinates of each intersection point P.

$$y_{ij}=Y_{LEFT}+\{(|Y_{RIGHT}|+|Y_{LEFT}|)/M\} \times j \qquad (5)$$

Other than the above example, the risk degree estimation device 20 may change the region where the mesh M is formed using information from the host vehicle traveling situation detection device 15. For example, the higher the vehicle speed of the host vehicle 100, the wider the region of the mesh M in front of the host vehicle 100. The higher the acceleration of the host vehicle 100, the wider the region of the mesh M in front of the host vehicle 100. The higher the deceleration of the host vehicle 100, the wider the region of the mesh M at the back of the host vehicle 100. A region of the mesh M lateral to the host vehicle 100 in the indication direction of the direction indicator is widened, and a region of the mesh M lateral to the host vehicle 100 in the opposite direction to the indication direction of the direction indicator is narrowed.

The risk degree estimation device 20 may change the region where the mesh M is formed using information relating to the surroundings of the host vehicle 100 from the obstacle detection device 11, the white line detection device 12, the road shape detection device 13, the host vehicle position detection device 16, and the surroundings database 17. For example, the surroundings of the host vehicle 100 are divided into four directions of the right front side, the left front side, the right back side, and the left back side, and the mesh M is generated only in a region where an obstacle is present. When a lane is recognized from white lines, the mesh M is generated only within the lane. When the road shape is a curve, the region of the mesh M in the bending direction of the curve is widened. Alternatively, at an intersection, the region of the mesh M in the left-right direction of the host vehicle 100 is widened. Near a facility, such as a school or a home for the aged, the region of the mesh M in the left-right direction of the host vehicle 100 is widened for the sake of safety of a pedestrian who crosses a road. In a direction of a blind spot when viewed from the host vehicle 100, the region of the mesh M in this direction is widened.

The risk degree estimation device 20 may change the region where the mesh M is formed depending on the state of the driver detected by the driver state detection device 14 or the operation state of the driver detected by the driver operation state detection device 18. For example, the lower the vigilance of the driver, the wider the region of the mesh M, and the higher the vigilance of the driver, the narrower the region of the mesh M. The region of the mesh M in the horizontal direction on the side on which steering torque is generated is widened, and the region of the mesh M in the horizontal direction opposite to the side on which steering torque is generated is narrowed. When the brake pedal is stepped on, the region of the mesh M in the forward direction is narrowed, and the region of the mesh M in the backward direction is widened. To the contrary, when the accelerator pedal is stepped on, the region of the mesh M in the forward direction is widened, and the region of the mesh M in the backward direction is narrowed. The region of the mesh M in the face direction or the eye direction of the driver is widened, and the region of the mesh M in the opposite direction to the face direction or the eye direction of the driver is narrowed. In this case, in a situation in which the risk degree is high, conversely, the region of the mesh M in the face direction or the eye direction of the driver may be narrowed, and the region of the mesh M in the opposite direction to the face direction or the eye direction of the driver may be widened.

The risk degree estimation device 20 may change the region where the mesh M is formed depending on the setting state of the control mode selector SW 19. For example, when the setting of LKA or LDW is ON, the mesh M is generated only within the front lane partitioned by the white lines. When the setting for reducing damage due to collision by ACC or PCS is ON, the region of the mesh M in front and at the back of the host vehicle 100 is widened. When the setting for avoiding collision by PCS is ON, the region of the mesh M in all directions of the host vehicle 100 is widened. When the setting of the parking assistance system is ON, the region of the mesh M in all directions of the host vehicle 100 is narrowed.

Figure 6:
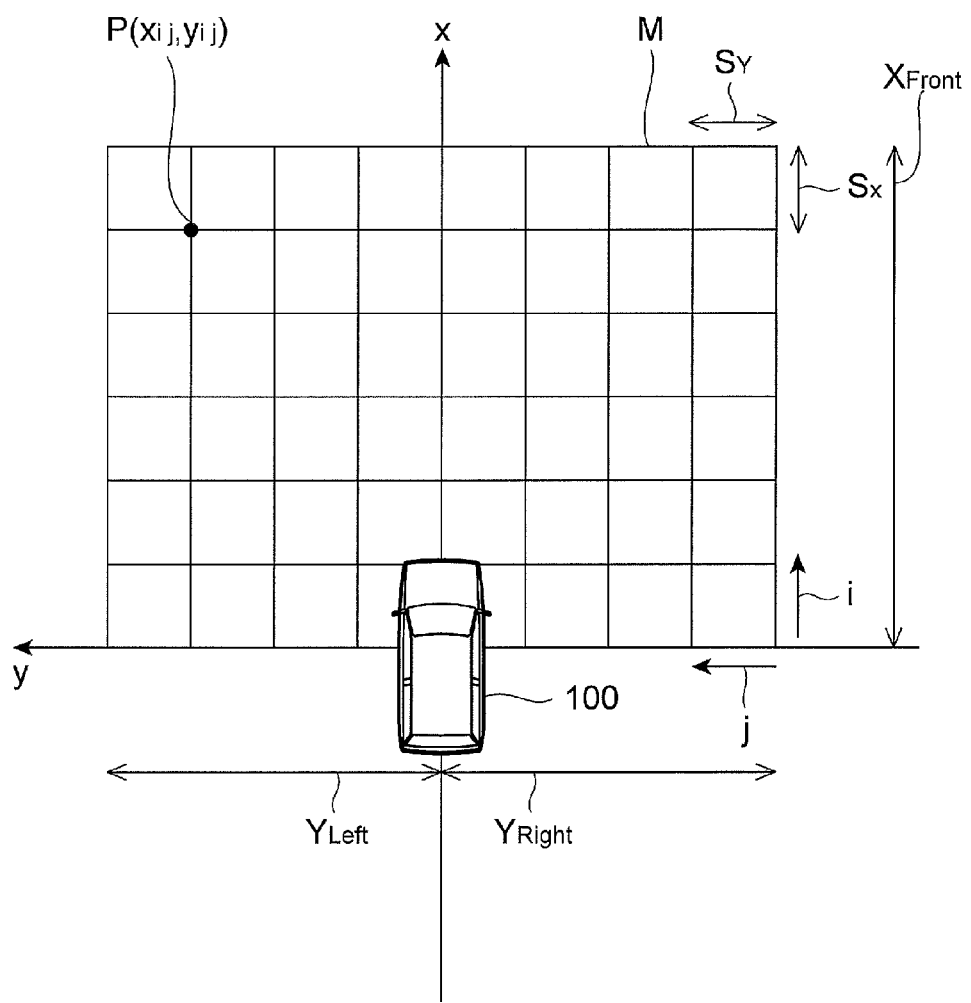
FIG. 6 is a diagram showing a mesh in which mesh spacing $S_X$ and $S_Y$ are set.

In this embodiment, as shown in FIG. 6, the number N of divisions in the X direction and the number M of divisions in the Y direction of the mesh M in the operation of FIG. 4 may be changed depending on the environment or state of the host vehicle 100 to change the spacing $S_X$ in the X direction and the spacing $S_Y$ in the Y direction between the intersection points P of the mesh M.

In this case, the risk degree estimation device 20 may change the spacing $S_X$ and $S_Y$ between the intersection points P of the mesh M using information from the host vehicle traveling situation detection device 15. For example, the higher the vehicle speed of the host vehicle 100, the wider the spacing $S_X$ and $S_Y$ between the intersection points P of the mesh M. The number N of divisions in the X direction and the number M of divisions in the Y direction of the mesh M may be calculated by Expression (6) such that the spacing $S_X$ and $S_Y$ between the intersection points P of the mesh M is widened in proportion to an increase in vehicle speed, and the spacing $S_X$ and $S_Y$ between the intersection points P of the mesh M may be calculated by Expression (7). Note that $N_0$ is the minimum value of the number N of divisions in the X direction of the mesh M, $M_0$ is the minimum value of the number M of divisions in the X direction of the mesh M, and $\alpha$, $\beta$, $\gamma$, and $\delta$ are arbitrary integers.

$$N=N_0+\{(\alpha/(v+\beta)\}$$

$$M=M_0+\{(\gamma/(v+\delta)\} \qquad (6)$$

$$S_X=X_{FRONT}/[N_0+\{(\alpha/(v+\beta)\}]$$

$$S_Y = (Y_{RIGHT} + Y_{LEFT})/[M_0 + \{(\gamma/(\nu+\delta)\}] \quad (7)$$

When a yaw rate is generated in the host vehicle 100, the spacing $S_Y$ between the intersection points P of the mesh M in the yawing direction of the host vehicle 100 is narrowed, and the spacing $S_Y$ between the intersection points of the mesh M in the opposite direction to the yawing direction of the host vehicle 100 is widened. If it is assumed that the number of divisions in the Y-axis left direction of the mesh M is $M_{LEFT}$, and the number of divisions in the Y-axis right direction of the mesh M is $M_{RIGHT}$, when the host vehicle 100 turns left (r≥0), the numbers $M_{LEFT}$ and $M_{RIGHT}$ of divisions may be calculated by Expression (8), and when the host vehicle 100 turns right (r<0), the numbers $M_{LEFT}$ and $M_{RIGHT}$ of divisions may be calculated by Expression (9).

$$M_{LEFT} = vr + (M_0/2)$$

$$M_{RIGHT} = M_0/2 \quad (8)$$

$$M_{LEFT} = M_0/2$$

$$M_{RIGHT} = -vr + (M_0/2) \quad (9)$$

If it is assumed that the spacing $S_Y$ between the intersection points P in the Y-axis left direction of the mesh M is $S_{YLEFT}$, and the spacing $S_Y$ between the intersection points P in the Y-axis right direction of the mesh M is $S_{YRIGHT}$, when the host vehicle 100 turns left (r≥0), the spacing $S_{YLEFT}$ and $S_{YRIGHT}$ may be calculated by Expression (10), and when the host vehicle 100 turns right (r<0), the spacing $S_{YLEFT}$ and $S_{YRIGHT}$ may be calculated by Expression (11).

$$S_{YLEFT} = Y_{LEFT}/\{vr + (M_0/2)\}$$

$$S_{YRIGHT} = Y_{RIGHT}/(M_0/2) \quad (10)$$

$$S_{YLEFT} = Y_{LEFT}/(M_0/2)$$

$$S_{YRIGHT} = Y_{RIGHT}/\{-vr + (M_0/2)\} \quad (11)$$

Similarly, as the acceleration of the host vehicle 100 is high, the spacing $S_X$ between the intersection points P of the mesh M in front of the host vehicle 100 is narrowed, and the spacing $S_X$ between the intersection points P of the mesh M at the back of the host vehicle 100 is widened. As the deceleration of the host vehicle 100 is high, the spacing $S_X$ between the intersection points P of the mesh M at the back of the host vehicle 100 is narrowed, and the spacing $S_X$ between the intersection points of the mesh M in front of the host vehicle 100 is widened. The spacing $S_Y$ between the intersection points P of the mesh M in the indication direction of the direction indicator is narrowed, and the spacing $S_Y$ between the intersection points P of the mesh M in the opposite direction to the indication direction of the direction indicator is widened.

The risk degree estimation device 20 may change the spacing $S_X$ and $S_Y$ between the intersection points P of the mesh M using information relating to the surroundings of the host vehicle 100 from the obstacle detection device 11, the white line detection device 12, the road shape detection device 13, the host vehicle position detection device 16, and the surroundings database 17. For example, the surroundings of the host vehicle 100 are divided into four directions of the right front side, the left front side, the right back side, and the left back side, and the spacing $S_X$ and $S_Y$ between the intersection points P of the mesh M in a region where an obstacle is present are narrowed. When a lane is recognized from white lines, the spacing $S_X$ and $S_Y$ between the intersection points P of the mesh M within the lane are set to predetermined offset values. Depending on the yaw rate to be detected of the host vehicle 100, the spacing $S_Y$ between the intersection points P of the mesh M in the yawing direction of the host vehicle 100 is narrowed, and the spacing $S_Y$ between the intersection points P of the mesh M in the opposite direction to the yawing direction of the host vehicle 100 is widened. When the road shape is a curve, the spacing $S_Y$ between the intersection points P of the mesh M in the bending direction of the curve is narrowed. Alternatively, at an intersection, the spacing $S_Y$ between the intersection points P of the mesh M in the left-right direction of the host vehicle 100 is narrowed. Near a facility, such as a school or a home for the aged, the spacing $S_Y$ of the mesh M in the left-right direction of the host vehicle 100 for the sake of safety of a pedestrian who crosses a road is narrowed. In a direction of a blind spot when viewed from the host vehicle 100, the spacing $S_Y$ of the mesh M in this direction is narrowed.

The risk degree estimation device 20 may change the spacing $S_X$ and $S_Y$ between the intersection points P of the mesh M depending on the state of the driver detected by the driver state detection device 14 or the operation state of the driver detected by the driver operation state detection device 18. For example, the lower the vigilance of the driver, the narrower the spacing $S_X$ and $S_Y$ between the intersection points P of the mesh M, and the higher the vigilance of the driver, the spacing $S_X$ and $S_Y$ between the intersection points P of the mesh M are widened. The spacing $S_Y$ between the intersection points P of the mesh M in the horizontal direction on the side on which steering torque is generated is narrowed, and the spacing $S_Y$ between the intersection points P of the mesh M in the horizontal direction opposite to the side on which steering torque is generated is widened. When the brake pedal is stepped on, the spacing $S_X$ between the intersection points P of the mesh M in the forward direction is widened, and the spacing $S_X$ between the intersection points P of the mesh M in the backward direction is narrowed. To the contrary, when the accelerator pedal is stepped on, the spacing $S_X$ between the intersection points P of the mesh M in the forward direction is narrowed, and the spacing $S_X$ between the intersection points P of the mesh M in the backward direction is widened. The spacing $S_X$ and $S_Y$ between the intersection points P of the mesh M in a direction in which the face direction of the driver is pointed are narrowed, and the spacing $S_X$ and $S_Y$ between the intersection points P of the mesh M in the opposite direction to the direction in which the face direction of the driver is pointed are narrowed. The spacing $S_X$ and $S_Y$ between the intersection points P of the mesh M in the eye direction of the driver are narrowed, and the spacing $S_X$ and $S_Y$ between the intersection points P of the mesh M in the opposite direction to the eye direction of the driver are widened. In this case, in a situation in which the risk degree is high, conversely, the spacing $S_X$ and $S_Y$ between the intersection points P of the mesh M in the face direction or the eye direction of the driver may be widened, and the spacing $S_X$ and $S_Y$ between the intersection points P of the mesh M in the opposite direction to the face direction or the eye direction of the driver may be narrowed.

The risk degree estimation device 20 may change the spacing $S_X$ and $S_Y$ between the intersection points P of the mesh M depending on the setting state of the control mode selector SW 19. For example, when the setting of LKA or LDW is ON, the spacing $S_X$ and $S_Y$ between the intersection points P of the mesh M within the front lane partitioned by the white lines are narrowed, and the spacing $S_X$ and $S_Y$ between the intersection points P of the mesh M in another region are widened. When the setting for reducing damage due to collision by ACC or PCS is ON, the spacing $S_X$ between the intersection points P of the mesh M in front and at the back of the host vehicle 100 is narrowed, and the spacing $S_Y$ between the intersection points P of the mesh M in the left-right direction of the host vehicle 100 is widened. When the setting for avoiding collision by PCS is ON, the spacing $S_X$ and $S_Y$ between the intersection points P of the mesh M in all directions of the host vehicle 100 are widened. When the setting of the parking assistance system is ON, the spacing $S_X$ and $S_Y$ between the intersection points P of the mesh M in all directions of the host vehicle 100 are narrowed.

Alternatively, the risk degree estimation device 20 may widen the spacing $S_X$ and $S_Y$ between the intersection points P of the mesh M with an increasing distance from the host vehicle 100. This is because the recognition accuracy of sensors is lowered on a farther side and high route recognition accuracy is not required on a farther side, and it is not necessary to make the spacing $S_X$ and $S_Y$ between the intersection points P of the mesh M smaller.

In this embodiment, the amount of information to be allocated to the information relating to the risk degree at each intersection point P of the mesh M may be changed depending on the environment or state of the host vehicle 100 to change the accuracy of information relating to the risk degree.

In this case, the risk degree estimation device 20 may change the amount of information to be allocated to the information relating to the risk degree at the intersection points P of the mesh M using information from the host vehicle traveling situation detection device 15. For example, as the vehicle speed of the host vehicle 100 is high, the amount of information to be allocated to the information relating to the risk degree at the intersection points P of the mesh M is coarsened. When a yaw rate is generated in the host vehicle 100, the amount of information to be allocated to the information relating to the risk degree at the intersection points P of the mesh M in the yawing direction of the host vehicle 100 is made fine (accuracy increases). As the vehicle speed of the host vehicle 100 is high, the amount of information to be allocated to the information relating to the risk degree at the intersection points P of the mesh M in front of the host vehicle 100 is made fine, and the amount of information to be allocated to the information relating to the risk degree at the intersection points P of the mesh M at the back of the host vehicle 100 is coarsened. The amount of information to be allocated to the information relating to the risk degree at the intersection points P of the mesh M in the indication direction of the direction indicator is made fine, and the amount of information to be allocated to the information relating to the risk degree at the intersection points P of the mesh M in the opposite direction to the indication direction of the direction indicator is coarsened.

The risk degree estimation device 20 may change the amount of information to be allocated to the information relating to the risk degree at the intersection points P of the mesh M using information relating to the surroundings of the host vehicle 100 from the obstacle detection device 11, the white line detection device 12, the road shape detection device 13, the host vehicle position detection device 16, and the surroundings database 17. For example, the surroundings of the host vehicle 100 are divided into four directions of the right front side, the left front side, the right back side, and the left back side, and the amount of information to be allocated to the information relating to the risk degree at the intersection points P of the mesh M in a region where an obstacle is present is made fine. When a lane is recognized by white lines, only the amount of information to be allocated to the information relating to the risk degree at the intersection points P of the mesh M within the lane is made fine. When the road shape is a curve, the amount of information to be allocated to the information relating to the risk degree at the intersection points P of the mesh M in the bending direction of the curve is made fine, and the amount of information to be allocated to the information relating to the risk degree at the intersection points P of the mesh M in the opposite direction to the bending direction of the curve is coarsened. Alternatively, at an intersection, the amount of information to be allocated to the information relating to the risk degree at the intersection points P of the mesh M is made fine. Near a facility, such as a school or a home for the aged, the amount of information to be allocated to the information relating to the risk degree at the intersection points P of the mesh M in the left-right direction of the host vehicle 100 is made fine for the sake of safety of a pedestrian who crosses a road. In a direction of a blind spot when viewed from the host vehicle 100, the amount of information to be allocated to the information relating to the risk degree at the intersection points P of the mesh M in this direction is made fine.

The risk degree estimation device 20 may change the amount of information to be allocated to the information relating to the risk degree at the intersection points P of the mesh M depending on the state of the driver detected by the driver state detection device 14 or the operation state of the driver detected by the driver operation state detection device 18. For example, as the driver has low vigilance, the amount of information to be allocated to the information relating to the risk degree at the intersection points P of the mesh M is made fine, and as the driver has high vigilance, the amount of information to be allocated to the information relating to the risk degree at the intersection points P of the mesh M is coarsened. The amount of information to be allocated to the information relating to the risk degree at the intersection points P of the mesh M on the side on which steering torque is generated is made fine, and the amount of information to be allocated to the information relating to the risk degree at the intersection points P of the mesh M in a direction opposite to the side on which steering torque is generated is coarsened. When the brake pedal is stepped on, the amount of information to be allocated to the information relating to the risk degree at the intersection points P of the mesh M in the forward direction is coarsened, and the amount of information to be allocated to the information relating to the risk degree at the intersection points P of the mesh M in the backward direction is made fine. On the contrary, when the accelerator pedal is stepped on, the amount of information to be allocated to the information relating to the risk degree at the intersection points P of the mesh M in the forward direction is made fine, and the amount of information to be allocated to the information relating to the risk degree at the intersection points P of the mesh M in the backward direction is coarsened. The amount of information to be allocated to the information relating to the risk degree at the intersection points P of the mesh M in a direction in which the face direction of the driver is pointed is made fine, and the amount of information to be allocated to the information relating to the risk degree at the intersection points P of the mesh M in the opposite direction to the direction in which the face direction of the driver is pointed is coarsened. The amount of information to be allocated to the information relating to the risk degree at the intersection points P of the mesh M in the eye direction of the driver is made fine, and the amount of information to be allocated to the information relating to the risk degree at the intersection points P of the mesh M in the opposite direction to the eye direction of the driver is coarsened. In this case, in a situation in which the risk degree is high, conversely, the amount of information to be allocated to the information relating to the risk degree at the intersection points P of the mesh M in the face direction or the eye direction may be coarsened, and the amount of information to be allocated to the information relating to the risk degree at the intersection points P of the mesh M in the opposite direction to the face direction or the eye direction of the driver may be made fine.

The risk degree estimation device 20 may change the amount of information to be allocated to the information relating to the risk degree at the intersection points P of the mesh M depending on the setting state of the control mode selector SW 19. For example, when the setting of LKA or LDW is ON, only the amount of information to be allocated to the information relating to the risk degree at the intersection points P of the mesh M within the front lane partitioned by the white lines is made fine, and the amount of information to be allocated to the information relating to the risk degree at the intersection points P of the mesh M in another region is coarsened. When the setting for reducing damage due to collision by ACC or PCS is ON, the amount of information to be allocated to the information relating to the risk degree at the intersection points P of the mesh M in front and at the back of the host vehicle 100 is made fine, and the amount of information to be allocated to the information relating to the risk degree at the intersection points P of the mesh M in the left-right direction of the host vehicle 100 is coarsened.

Alternatively, as the accuracy of information which should be far from the host vehicle 100 is lowered, the risk degree estimation device 20 coarsens the amount of information to be allocated to the information relating to the risk degree at the intersection points P of the mesh M, lowers the accuracy of the information relating to the risk degree at each intersection point P. As the accuracy of information which should be close to the host vehicle 100 increases, the risk degree estimation device 20 may make the amount of information to be allocated to the information relating to the risk degree at the intersection points P of the mesh M fine to increase the accuracy of the information relating to the risk degree at each intersection point P.

Hereinafter, the details of the calculation of the risk degree at each intersection point P of the mesh M in the risk degree estimation device 20 will be described. A risk degree function $RVn(x,y)$ representing the risk degree around obstacles $n=1$ to N, such as vehicles, in the region where the mesh M is set is expressed by Expression (12).

$$RVn(x,y)=An \times \exp[-\frac{1}{2} \times \{((x-xn)/Sxn)^2+((y-yn)/Syn)^2\}] \quad (12)$$

N: number of vehicle obstacles
An: coefficient
xn: x coordinate position of obstacle n
yn: y coordination position of obstacle n
Sxn: x-direction variation of obstacle n ($\propto vxn$ (x-direction speed of obstacle n))
Syn: y-direction variation of obstacle n ($\propto vyn$ (y-direction speed of obstacle n))

A risk degree function $RL(x,y)$ representing the risk degree of a route calculated from information relating to white lines, a curbstone, or the like in the region where the mesh M is set is expressed by Expression (13).

$$RL(x,y)=B \times (y-yl)^2 \quad (13)$$

B: coefficient
yl: y coordinate of road center

An overall risk degree function $R(x,y)$ representing the overall risk degree in the region where the mesh M is set is expressed by Expression (14). The risk degree estimation device 20 calculates the risk degree by Expression (14) for the coordinates P(x,y) of each intersection point P.

$$R(x,y)=\Sigma\{RVn(x,y)\}+RL(x,y) \quad (14)$$

Hereinafter, the generation of the target route by the target route generation device 30 will be described. The target route generation device 30 determines an intersection point P which becomes a target point of the host vehicle 100. The target route generation device 30 searches for a route, in which the total risk degree obtained through Expression (14) is minimal, from among the routes from the current position to the target point. In this case, the target route generation device 30 may use a route search method in a general Dijkstra method or an A* method.

Hereinafter, driving assistance using the driving assistance method determination device 40 will be described. The driving assistance method determination device 40 calculates a future predicted position (Xm,Ym) of the host vehicle 100 after T seconds from the current speed v and the yaw rate r of the host vehicle 100 through Expression (15).

[Equation 1]

$$\theta=\int_0^T r \cdot dt$$

$$Xm=\int_0^T v \cdot \cos\theta \cdot dt$$

$$Ym=\int_0^T v \cdot \sin\theta \cdot dt \quad (15)$$

The driving assistance method determination device 40 calculates the Y coordinate Yt of the target route at Xm [m] ahead. When the difference |Yt−Ym| between the predicted route of the host vehicle 100 at Xm [m] ahead and the target route is equal to or greater than a given value, the driving assistance method determination device 40 attracts the driver's attention using the display device 51 or the speech device 52, and starts driving assistance using the assistance device 53.

In this embodiment, the risk degree estimation device 20 of the driving assistance device 10 calculates the potential risk degree at a plurality of intersection points P of the mesh M set around the host vehicle 100. The risk degree estimation device 20 changes the amount of information relating to the potential risk degree calculated for the entire region of the mesh M in which the intersection points P are set in accordance with at least one of the environment and state of the host vehicle 100. For this reason, it becomes possible to calculate the potential risk degree around the host vehicle 100 depending on the situation.

The risk degree estimation device 20 changes the region of the mesh M in which the intersection points P are set in accordance with at least one of the environment and state of the host vehicle 100 to change the amount of information relating to the potential risk degree for the entire region of the mesh M in which the intersection points P are set, making it possible to calculate the potential risk degree around the host vehicle 100 in the region depending on the situation.

The risk degree estimation device 20 changes the spacing between the intersection points P of the mesh M in accordance with at least one of the environment and state of the host vehicle 100 to change the amount of information relating to the potential risk degree calculated for the entire region of the mesh M in which the intersection points P are set, making it possible to calculate the potential risk degree around the host vehicle 100 at the density of the intersection points P at which the potential risk degree depending on the situation is calculated.

The risk degree estimation device 20 changes the amount of information relating to the potential risk degree calculated at each intersection point P of the mesh M in accordance with at least one of the environment and state of the host vehicle 100, making it possible to calculate the potential risk degree around the host vehicle 100 with the calculation load depending on the situation.

The risk degree estimation device 20 makes the amount of information relating to the potential risk degree calculated in the traveling direction of the host vehicle 100 greater than the amount of information relating to the potential risk degree calculated in a direction other than the traveling direction of the host vehicle 100. For this reason, it is possible to intensively calculate the potential risk degree in the traveling direction of the host vehicle 100 which is more important, making it possible to calculate the potential risk degree around the host vehicle 100 with the distribution of the amount of information and the calculation load depending on the situation.

The risk degree estimation device 20 makes the amount of information relating to the potential risk degree calculated in the steering direction of the host vehicle 100 greater than the amount of information relating to the potential risk degree calculated in a direction other than the steering direction of the host vehicle 100. For this reason, it is possible to intensively calculate the potential risk degree in the traveling direction of the host vehicle 100 on the basis of the steering direction directly representing the traveling direction of the host vehicle 100, making it possible to calculate the potential risk degree around the host vehicle 100 with the distribution of the amount of information and the calculation load depending on the situation.

The risk degree estimation device 20 makes the amount of information relating to the potential risk degree calculated per unit region of the region in which the mesh M is set when the speed of the host vehicle 100 is high smaller than the amount of information relating to the potential risk degree calculated per unit area of the region of the mesh M when the speed of the host vehicle 100 is low. For this reason, it is possible to eliminate an unnecessary operation to calculate the detailed potential risk degree in a narrow region with less importance during high speed, making it possible to calculate the potential risk degree around the host vehicle 100 with the distribution of the amount of information and the calculation load depending on the situation.

When the accelerator pedal of the host vehicle 100 is stepped on, the risk degree estimation device 20 makes the amount of information relating to the potential risk degree calculated in the traveling direction of the host vehicle 100 greater than the amount of information relating to the potential risk degree in a direction other than the traveling direction of the host vehicle 100. For this reason, it is possible to intensively calculate the potential risk degree in the traveling direction of the host vehicle 100 which is more important during acceleration before the host vehicle 100 is actually accelerated, making it possible to calculate the potential risk degree around the host vehicle 100 with the distribution of the amount of information and the calculation load depending on the situation.

When the brake pedal of the host vehicle 100 is stepped on, the risk degree estimation device 20 makes the amount of information relating to the potential risk degree calculated in the opposite direction to the traveling direction of the host vehicle 100 greater than the amount of information relating to the potential risk degree calculated in the traveling direction of the host vehicle 100. For this reason, it is possible to intensively calculate the potential risk degree in the opposite direction to the traveling direction of the host vehicle 100 which is more important during deceleration before the host vehicle 100 is actually decelerated, making it possible to calculate the potential risk degree around the host vehicle 100 with the distribution of the amount of information and the calculation load depending on the situation.

When the direction indicator of the host vehicle 100 is operated, the risk degree estimation device 20 makes the amount of information relating to the potential risk degree calculated in the indication direction of the direction indicator of the host vehicle 100 greater than the amount of information relating to the potential risk degree calculated in the opposite direction to the indication direction of the direction indicator of the host vehicle 100. For this reason, it is possible to intensively calculate the potential risk degree in the traveling direction of the host vehicle 100 which is more important during steering before the traveling direction of the host vehicle 100 is actually changed, making it possible to calculate the potential risk degree around the host vehicle 100 with the distribution of the amount of information and the calculation load depending on the situation.

The risk degree estimation device 20 makes the amount of information relating to the potential risk degree calculated in a blind spot when viewed from the host vehicle 100 greater than the amount of information relating to the potential risk degree in a region other than the blind spot when viewed from the host vehicle 100. For this reason, it is possible to intensively calculate the potential risk degree in the blind spot when viewed from the host vehicle 100 which is more importance, making it possible to calculate the potential risk degree around the host vehicle 100 with the distribution of the amount of information and the calculation load depending on the situation.

The risk degree estimation device 20 makes the amount of information relating to the potential risk degree calculated in a direction other than either the face direction or the eye direction of the driver of the host vehicle 100 greater than the amount of information relating to the potential risk degree calculated in either the face direction or the eye direction of the driver of the host vehicle 100. For this reason, it is possible to intensively calculate the potential risk degree in the opposite direction to either the face direction or the eye direction of the driver of the host vehicle 100 which should be preferentially calculated in a situation in which the risk degree is high, making it possible to calculate the potential risk degree around the host vehicle 100 with the distribution of the amount of information and the calculation load depending on the situation.

The risk degree estimation device 20 makes the amount of information relating to the potential risk degree calculated when the driver of the host vehicle 100 has low vigilance greater than the amount of information relating to the potential risk degree calculated when the driver of the host vehicle 100 has high vigilance. For this reason, it is possible to intensively calculate the potential risk degree in a situation in which the driver has low vigilance and the risk degree is high, making it possible to calculate the potential risk degree around the host vehicle 100 with the distribution of the amount of information and the calculation load depending on the situation.

In this embodiment, the target route generation device 30 generates the target route of the host vehicle 100 on the basis of the potential risk degree at a plurality of intersection points P of the mesh M calculated by the risk degree estimation device 20. For this reason, the host vehicle 100 travels along the target route generated on the basis of the potential risk degree, thereby reducing potential risk.

Although the embodiment of the invention has been described, the invention is not limited to the foregoing embodiment, and various modifications may be made.

INDUSTRIAL APPLICABILITY

According to the potential risk degree calculation device of the invention, it becomes possible to calculate the potential risk degree around the host vehicle depending on the situation.

REFERENCE SIGNS LIST

10: driving assistance device
11: obstacle detection device
12: white line detection device
13: road shape detection device
14: driver state detection device
15: host vehicle traveling situation detection device
16: host vehicle position detection device
17: surroundings database
18: driver operation state detection device
19: control mode selector SW
20: risk degree estimation device
30: target route generation device
40: driving assistance method determination device
51: display device
52: speech device
53: assistance device
100: host vehicle

The invention claimed is:

1. A host vehicle comprising:
a driving assistance device including a risk degree calculation unit, the driving assistance device further comprising at least one of the following:
an obstacle detection device;
a white line detection device;
a road shape detection device;
a driver state detection device;
a host vehicle traveling situation detection device;
a host vehicle position detection device;
a surroundings database;
a driver operation state detection device;
a control mode selector;
a target route generation device,
a driving assistance ECU,
a display device; and
a speech device,
wherein the risk degree calculation unit calculates the risk degree at a plurality of points in a mesh set according to a surface area of a region around the host vehicle,
wherein the risk degree calculation unit changes the amount of information relating to the risk degree calculated for the entire region in which a number of the points is set in accordance with at least one of the environment and state of the host vehicle, and
the risk degree calculation unit varies the number of the points within the mesh set according to the surface area of the region around the host vehicle to decrease when the speed of the host vehicle increases.

2. The host vehicle according to claim 1,
wherein the risk degree calculation unit changes the region in which the points are set in accordance with at least one of the environment and state of the host vehicle to change the amount of information relating to the risk degree calculated for the entire region in which the points are set.

3. The host vehicle according to claim 1,
wherein the risk degree calculation unit changes the spacing between the points in accordance with at least one of the environment and state of the host vehicle to change the amount of information relating to the risk degree calculated for the entire region in which the points are set.

4. The host vehicle according to claim 1,
wherein the risk degree calculation unit changes the amount of information relating to the risk degree calculated at each point in accordance with at least one of the environment and state of the host vehicle to change the amount of information relating to the risk degree calculated for the entire region in which the points are set.

5. The host vehicle according to claim 1,
wherein the risk degree calculation unit makes the amount of information relating to the risk degree calculated in the traveling direction of the host vehicle greater than the amount of information relating to the risk degree calculated in a direction other than the traveling direction of the host vehicle.

6. The host vehicle according to claim 5,
wherein the risk degree calculation unit makes the amount of information relating to the risk degree calculated in the steering direction of the host vehicle greater than the amount of information relating to the risk degree in a direction other than the steering direction of the host vehicle.

7. The host vehicle according to claim 1,
wherein, when a direction indicator of the host vehicle is operated, the risk degree calculation unit makes the amount of information relating to the risk degree calculated in the indication direction of the direction indicator of the host vehicle greater than the amount of information relating to the risk degree calculated in an opposite direction to the indication direction of the direction indicator of the host vehicle.

8. The host vehicle according to claim 1,
wherein the risk degree calculation unit makes the amount of information relating to the risk degree calculated in a blind spot when viewed from the host vehicle greater than the amount of information relating to the risk degree calculated in a region other than the blind spot when viewed from the host vehicle.

9. The host vehicle according to claim 1,
wherein the risk degree calculation unit makes the amount of information relating to the risk degree calculated in either the face direction or the eye direction of the driver of the host vehicle greater than the amount of information relating to the risk degree calculated in a direction other than either the face direction or the eye direction of the driver of the host vehicle.

10. The host vehicle according to claim 1,
wherein the risk degree calculation unit makes the amount of information relating to the risk degree calculated in a direction other than either the face direction or the eye direction of the driver of the host vehicle greater than the amount of information relating to the risk degree calculated in either the face direction or the eye direction of the driver of the host vehicle.

11. The host vehicle according to claim 1,
wherein the risk degree calculation unit makes the amount of information relating to the risk degree calculated when the driver of the host vehicle has low vigilance greater than the amount of information relating to the risk degree calculated when the driver of the host vehicle has high vigilance.

12. The host vehicle according to claim 1, further comprising:

a target route generation unit which generates a target route of the host vehicle on the basis of the risk degree at a plurality of points calculated by the risk degree calculation unit.

13. A host vehicle comprising:
a driving assistance device including a risk degree calculation unit, the driving assistance device further comprising at least two of the following:
an obstacle detection device;
a white line detection device;
a road shape detection device;
a driver state detection device;
a host vehicle traveling situation detection device;
a host vehicle position detection device;
a surroundings database;
a driver operation state detection device;
a control mode selector;
a target route generation device,
a driving assistance ECU,
a display device; and
a speech device,
wherein the risk degree calculation unit is programmed to:
calculate the risk degree at a plurality of points in a mesh set according to a surface area of a region around the host vehicle,
change the amount of information relating to the risk degree calculated for the entire region in which a number of the points is set in accordance with at least one of the environment and state of the host vehicle, and
vary the number of the points within the mesh set according to the surface area of the region around the host vehicle to decrease when the speed of the host vehicle increases.

* * * * *